Aug. 9, 1960 D. D. BABB 2,948,861

QUANTUM MECHANICAL RESONANCE DEVICES

Filed July 29, 1957 3 Sheets-Sheet 1

INVENTOR,
DAVID D. BABB

BY

Harry M. Saragovitz
ATTORNEY

Aug. 9, 1960 D. D. BABB 2,948,861

QUANTUM MECHANICAL RESONANCE DEVICES

Filed July 29, 1957 3 Sheets-Sheet 2

INVENTOR,
DAVID D. BABB
BY
Harry M. Saragovitz
ATTORNEY.

QUANTUM MECHANICAL RESONANCE DEVICES

Filed July 29, 1957 3 Sheets-Sheet 3

INVENTOR,
DAVID D. BABB

BY

Harry M. Saragovitz
ATTORNEY.

United States Patent Office 2,948,861

Patented Aug. 9, 1960

2,948,861

QUANTUM MECHANICAL RESONANCE DEVICES

David D. Babb, Cambridge, Mass., assignor to the United States of America as represented by the Secretary of the Army Filed July 29, 1957, Ser. No. 674,981

18 Claims. (Cl. 331—3)

(Granted under Title 35, U.S. Code (1952), sec. 266)

The invention described herein may be manufactured and used by or for the Government for governmental purposes, without the payment of any royalty thereon.

My invention relates generally to apparatus utilizing quantum mechanical resonance. Such resonances result from transitions between discrete quantized energy states, and have been produced with atomic, nuclear, and molecular particles.

Until recently the most accurate frequency standards were made by using quartz crystal oscillators corrected according to astronomical observations. With the development of microwave spectroscopy, there have been moderately successful efforts in the last ten years to make better frequency standards based on the fact that individual atoms or molecules absorb or radiate energy at very well defined frequencies in the microwave region during transitions between discrete energy states. The first of these devices simply measured the absorption of power in a wave guide containing gas molecules, and used a servo loop to keep the microwave oscillator at the frequency where the absorption was maximum. It was found that because the servo loop could only control the frequency to a certain fraction of the width of the absorption resonance that the instabilities were at least as great as those of quartz crystal oscillators. The problem of making a practical atomic clock thus resolved itself to reducing the fraction of the line width over which the frequency would drift and reducing the width of the resonance.

Several prior methods have explored these two factors more or less successfully. Some of them require large, high-vacuum containers, which render them of limited use.

One of the prior devices, known as the maser, achieves additional control of the frequency for a given line width by causing molecular particles to radiate power spontaneously at their natural frequency. This is done by passing a collimated beam of ammonia gas through a Stark (electric field) focuser which removes the molecules in the lower energy state from those in the upper energy state. The latter are then passed into a resonant cavity where, in going from an upper to a lower energy state, they spontaneously generate waves at a microwave frequency.

A disadvantage of the maser is that it requires that a steady stream of gas at low pressure be pumped through the cavity, so that it cannot be made as a sealed in system. In addition, since intermolecular collisions must be avoided, a high vacuum must be maintained.

In the maser, electrical resonance of molecular transitions from a higher to a lower state is utilized. Another method of producing oscillations at microwave frequencies is to utilize transitions of atomic energy states to obtain magnetic resonance effects. R. H. Dicke and J. P. Wittke in Physical Review, vol. 96, pages 530 and 531, report that a reduced line width for a magnetic resonance of atomic hydrogen gas can be obtained by introducing molecular hydrogen into the microwave cavity where the resonance was being observed. The width of the resonance is essentially the reciprocal of the time during which a particle can be observed without being sufficiently disturbed by collisions to change its energy state. Collisions with the walls of the cavity caused relaxation, while collisions with molecular hydrogen did not. In this manner, the time between wall collision, was increased by the need for the atomic hydrogen to diffuse through the molecular hydrogen.

It is an object of my invention to provide a resonance device using particles which have a relatively long path of travel before relaxation occurs, without the need for large evacuated containers.

It is a further object to decrease the line width of atomic resonances by means of non-relaxing wall collisions to increase the time in which atomic particles remain in an unrelaxed state.

It is a further object of the invention to provide an improved atomic resonance device which can be operated as a sealed-in device.

It is a further object of the invention to provide an improved atomic resonance device in which strong magnetic resonances are developed, thereby providing an output of higher amplitude.

In accordance with this invention, there is provided a source of a collimated beam of atoms. The beam is passed through a magnetic focuser which defocuses the atoms in the undesired lower state and focuses the atoms in the desired upper state. The latter are passed into a sealed container positioned inside a main microwave cavity tuned to resonate in the fundamental mode to the frequency of the wave emitted by the atom during transition from the upper to the lower state. The container is of a dielectric material which prevents the atoms from permeating the cavity but permits transfer thereto of the wave energy spontaneously generated by the atoms during transition. The container is made of a material which least attracts and has a minimum reaction time with atoms colliding therewith, so that the atoms can be deflected thereby many times without causing relaxation. This permits the use of a small cavity and yet provides a long path of travel for the atoms before relaxation occurs.

Atomic transitions generate energy at much lower levels than molecular transitions. In accordance with this invention, an auxiliary cavity tuned to the same frequency in the fundamental mode as the main cavity, is positioned between the focuser and the main cavity so that the focused beam passes through it. A stimulating signal at the resonance frequency is applied to the auxiliary cavity, of such an intensity that as much as half the maximum possible radiation is induced in this cavity. This causes a very large increase in the spontaneous emission in the main cavity. The amplitude of the main cavity output is peaked only at the frequency of the resonance and is negligible at more than a few line widths away from this frequency. Thus the microwave system of the cavities behaves as a unidirectional, narrow, band-pass filter or amplifier and can be made into an oscillator by amplifying the output of the beam device and applying it to the auxiliary cavity.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing in which:

Figure 1:
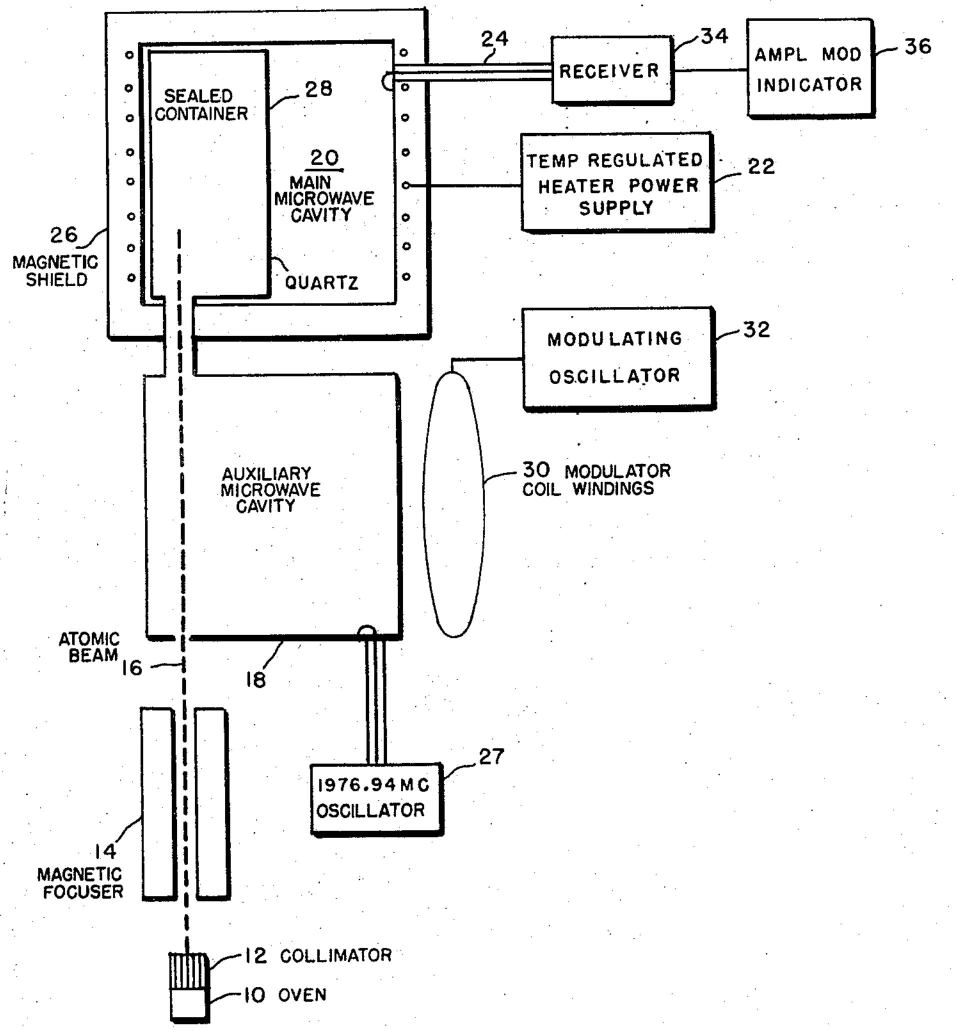
Figure 1 is a schematic representation of an atomic resonance device embodying the invention.

Referring to Figure 1, the invention comprises an oven 10 for vaporizing a relatively heavy element such as silver. The vapor is passed through a multi-channel collimator 12 and thence through a quadruple magnet 14 which, because of the Zeeman effect, defocuses the lower state atoms and sharply focuses the upper state atoms into a relatively sharp beam represented by broken line 16. The beam is passed through an auxiliary microwave cavity 18 and thence into a main microwave cavity 20, which is heated by means of heater wires powered by a temperature-regulated power supply 22. A constant main cavity temperature is maintained by conventional means, such as a servo system associated with the power supply and controlled by a temperature sensitive resistor (not shown) inside the cavity. Both cavities may be cylindrical and tuned to a suitable fundamental mode to the frequency of the oscillation generated during transitions from the upper to the lower state.

The cavity temperature must be at least as high as the vaporizing temperature of the metal vapor, and preferably considerably higher. Temperatures from 800–1400 degrees centigrade may be used for silver vapor. The vapor pressure in cavity 20 should preferably be almost $10^{-5}$ mm. of mercury or higher, although lower pressure may be used.

The operation of the structure will now be described without reference to the function of cavity 18. The atoms in cavity 20 spontaneously drop to the lower state and thus generate radio frequency in the microwave region. The cavity is tuned to this frequency and power may be extracted therefrom by means of a wave guide or concentric line 24. A magnetic shield 26 surrounding the cavity shields it from external magnetic fields. The magnetic shield may surround the entire equipment. In addition, electromagnets, not shown, are positioned around cavity to create a static magnetic field which can be preset to a desired intensity and which can be adjusted along three dimensions, as is conventional in atomic resonance devices.

For practical reasons, the cavity should be as small as possible. On the other hand, the width of the resonance line is substantially the reciprocal of the time during which a particle travels before collisions occur and bring about relaxation. Hence, the longer the time of travel, the smaller the width of the resonance line. To accomplish this, the time of travel is increased by providing walls made of, or coated with, material which does not produce relaxation as the atoms bounce off the walls.

To this end, the gas is not permitted to permeate the entire cavity, but is kept confined within a sealed container 28 positioned within the cavity and of a size which is about half the size of the cavity. This container is made of non-relaxing insulating material or may have its inner wall coated with such material. The material must be capable of withstanding the intense heat, in addition to having non-relaxing properties. Quartz may be used, although other oxides such as alumina, beryllia, magnesia, or zirconia may also be used. The main cavity 20 may be made of molybdenum. It is tuned to the frequency of the wave generated during the state transitions of silver atoms. If the atomic weight of the silver is 109, the frequency generated is 1976.94 megacycles per second.

It is to be understood that the entire equipment or at least that portion of it containing the silver vapor, will be contained in an evacuated container (not shown) as is usual in devices of the type.

Vapors other than that of silver can be used, without causing relaxation due to wall collisions with the oxide surface. The principles governing the choice of gases which may be used will now be considered.

The estimation of the probability that a wall collision will cause a relaxation divides naturally into three phases, viz., the study of the position of the atom during collision as a function of time, the estimation of electromagnetic fields due to the surface at the position of the particle, and the calculation of the various spectral interactions of the particle with this field. The first phase is the problem of absorption of gas on a solid, and in this connection the first problem to be considered is the temperature necessary to prevent adsorption to the necessary degree. It is found that under the best possible condition this temperature for silver is close to 1000° C. All known polymers dissociate at temperature below 500° C., including methylsilane and the methylsilicone that it forms when coated on the surface of a solid. This leads to the conclusion that the metal oxides are the most likely to give the desired properties, which include being an electrical insulator so that electron exchange with the adsorbed metal atom will not occur. A coating of fused silica or alumina will allow sufficiently high operating temperature. Beryllia, magnesia, or zirconia could be used providing the required firing temperatures of over 2000° C. could be obtained.

It is important that the element used with such a hot oxide surface will not leave the surface in an ionic state. To be reasonably certain of avoiding this difficulty it is necessary to pick a metal having an odd electron and which has an ionization potential greater than the work function of the surface, which roughly amounts to choosing a metal below hydrogen in the electromotive series. This eliminates all the alkali metals and probably thallium from further consideration, and leaves the coinage metals (copper, silver, and gold) among the odd-electron atoms.

Adsorption is generally divided into two classifications, chemical adsorption and physical adsorption, depending on whether or not there is any ionic or convalent bonding to the surface. If not, there are still Van der Waals forces to cause physical adsorption. If chemical forces are present the energy of association with the surface, or the adsorption energy, is several times larger, and this makes the average time of association with the surface several orders of magnitude larger. Since there are unused chemical bonds at the surface of a solid due to the discontinuity of the lattice, chemical adsorption is likely to be present if the gas atoms will react chemically with any of the atoms of the lattice. To avoid chemical adsorption, therefore, the beam atoms should not form a stable oxide at the operating temperatures. Copper does not meet this condition, but silver and gold do. With silver the temperatures required to reach a given vapor pressure are considerably lower.

A gas atom colliding with a surface may do any one of several things. First, it may be elastically reflected, i.e., not adsorbed, thus spending very little time in association with the surface and having little chance of hyperfine relaxation. Second, it may be caught by the potential well at the surface and spend some time wandering over the surface at a fraction of its thermal velocity and vibrating in the direction normal to the surface until it happens to escape due to receiving some extra thermal energy. If the time on the surface is short enough and the interaction with the field of the lattice is weak enough, it will not suffer a hyperfine relaxation. Since part of the surface is covered with adsorbed atoms, the atom may collide with another of its own kind, with the result that there is almost sure to be a relaxation due to electron discharge. The probability of adsorption is higher than that of reflection so that if relaxation is to be avoided the particles must leave after being adsorbed with a very low probability of relaxation. For physical adsorption, the speed of motion over the surface is very close to the thermal velocity but is not so high that collisions between adsorbed atoms dominate, as a relaxation mechanism, over interaction with the lattice field at the operating point to be used. The average time of association with the surface and the relaxation time due to lattice interaction for an adsorbed atom are thus the pertinent dependent variables of the operating temperature and pressure.

Brunauer, Emmet, and Teller have published, in the Journal of the American Chemical Society, vol. 60, pages 309–319, a useful theory of adsorption which gives the fraction of the surface covered as a function of pressure and temperatures and three parameters of the material. Two of these are the constants from the Clausius-Clapyron equation for the vapor pressure of the metal. The other is the energy of association with the surface. Two appropriate methods of estimating this parameter, one based on the dissociation temperature of $Ag_2O$, and the other based on combined vapor-pressure data of the adsorbent and adsorbate, give energies differing by a factor of 2. The adsorption time is easily computed from the fraction of the surface covered using the kinetic theory expression for the number of atoms crossing unit area, and thus being adsorbed, per unit time. Because the energy enters into the expression for the time as a factor in an exponent, the uncertainty of a factor of 2 leads to an uncertainty of a factor of 30 in the adsorption time at a given temperature. For this uncertainty, the temperature at which the adsorption time is $10^{-10}$ seconds is between 800° C. and 1200° C. at pressures of between $10^{-5}$ and $10^{-7}$ mm. of mercury.

Providing that the surface is smooth, the time between wall collisions will be about $10^{-3}$ seconds. The average magnetic field in the vicinity of the surface is about 200 gauss and the electric field is of the order of $10^5$ volts/cm. Thus the electromagnetic field that the particle sees is a strong pulsed field with a very small duty cycle. Preliminary calculations of all the relaxations that such a field could cause indicate that, contrary to expectations, it is the electric field which causes the most trouble. Also it appears that it is not the Fourier components at the particular transition frequencies that cause the most broadening, but the randomness of the Stark shift due to temporary polarization of the atom while on the surface. Since the phase shift with respect to a signal at the mean shifted frequency performs a random walk, the adsorption time has to be less than the time required for 180° phase shift by a factor of the square root of the number of collisions expected before relaxation, or a factor of about 30. With a relaxation time of between $10^{-7}$ and $10^{-8}$ seconds, the required maximum adsorption time for 1000 collisions is $10^{-8.5}$ to $10^{-9.5}$ and the required operating temperature is between 659° C. and 1100° C. The temperature at which one monomolecular layer of $Al_2O_3$ will be lost from the coating or the container on the inside of the cavity per hour due to evaporation is 1120° C., and for silica the corresponding temperature is 1080° C. The coating can be hundreds of thousands of layers thick so that this would correspond to a useful life.

Since it is desired to avoid the need for a stimulating oscillator of very high stability and the need for a T–R system, another way of increasing further the probability of emission for a given number particles without driving the hot cavity externally is used herein.

R.H. Dicke has published, in the Physical Review, vol. 93, pages 99–110, theory of spontaneous emission which states that the probability of spontaneous emission of a gas is largest if the phase of the oscillating polarization present in each particle is the same and the amplitude of the oscillating polarizaiton is at a maximum. He shows that the amplitude will be at a maximum if the particles are half way between the two states making up the transition whose radiation is being measured. He points out that one way of achieving such a state is to first get all the particles to the same fractional admixture of the two states by getting them all into the upper state, then to achieve the mixed state by application of a microwave pulse of appropriate amplitude and duration. Since all particles then have been put into their mixed state by the same microwave excitation, all their polarizations will be oscillating in phase. These general predictions have been verified by the use of an experimental technique based on the theory used in the pancake cavity experiment. The focuser of the atomic oscillator produces a beam of particles all in the upper state. If the probability of transition in the mixed state is high enough to maintain a field in the cavity sufficient to cause the gas to stay in the mixed state, the cavity may be said to oscillate. If the necessary field cannot be maintained, the probability of transition will drop as the field drops, generating still less field, less probability, and so forth until the spontaneous emission drops far below the detectable level. If another device can be used to maintain the mixed state a detectable amount of coherent emission will be available for a much smaller gas density. The power output will vary with the square of the beam intensity and the minimum permissible beam intensity will be determined by noise consideration.

An example of the way in which this mixed state can be maintained despite low beam intensity is illustrated in Figure 1. Cavity 18, positioned between focuser 14 and hot cavity 20, is excited from an external source 27 of 1976.94 mc. oscillations with sufficient strength so that the particles will be thrown into the mixed state during their transit across the cavity. Thus the gas is already in the mixed state when it enters the hot cavity 20. For practical beam intensity, the amount of additional state change due to the spontaneous emission is only a small fraction of a complete change of state. The drive required in the first cavity is about 1 milliwatt and the output power of the second cavity is about $10^{-13}$ watts. The phase stability of the driving oscillation source must be such that the particles that are just entering the main cavity are still roughly in phase with those that have been there for about one relaxation time. This corresponds to a frequency stability of about 1 part to $10^{10}$ for 1 second, and can most easily be accomplished by phase locking the driving oscillator to the output signal. The driving signal could be obtained from the output signal by direct amplification, but if the 100 db gain required is difficult to achieve at about 2000 mc., the same result can be accomplished by other methods as hereinafter described.

By Zeeman modulating the first cavity by means of modulating coils 30 energized by a modulation source 32, the fraction of lower state mixed in the gas in the main cavity can be modulated, thus modulating the transition probability. If the modulating frequency is higher than the reciprocal of the relaxation time, then the variations in output amplitude will not be able to follow the changes of that probability, and the amplitude modulation of the output will be attenuated. This is due to the fact that the cavity contains unrelaxed atoms from all probability classes at all times rather than just of the class that is presently entering the cavity. By detecting the variation in the amplitude modulation of the output with modulating frequency, by means of a receiver 34 to which is coupled an amplitude modulation indicator or recorder 36, the relaxation time can be measured and the number of collisions before relaxation can be calculated.

Figure 2:
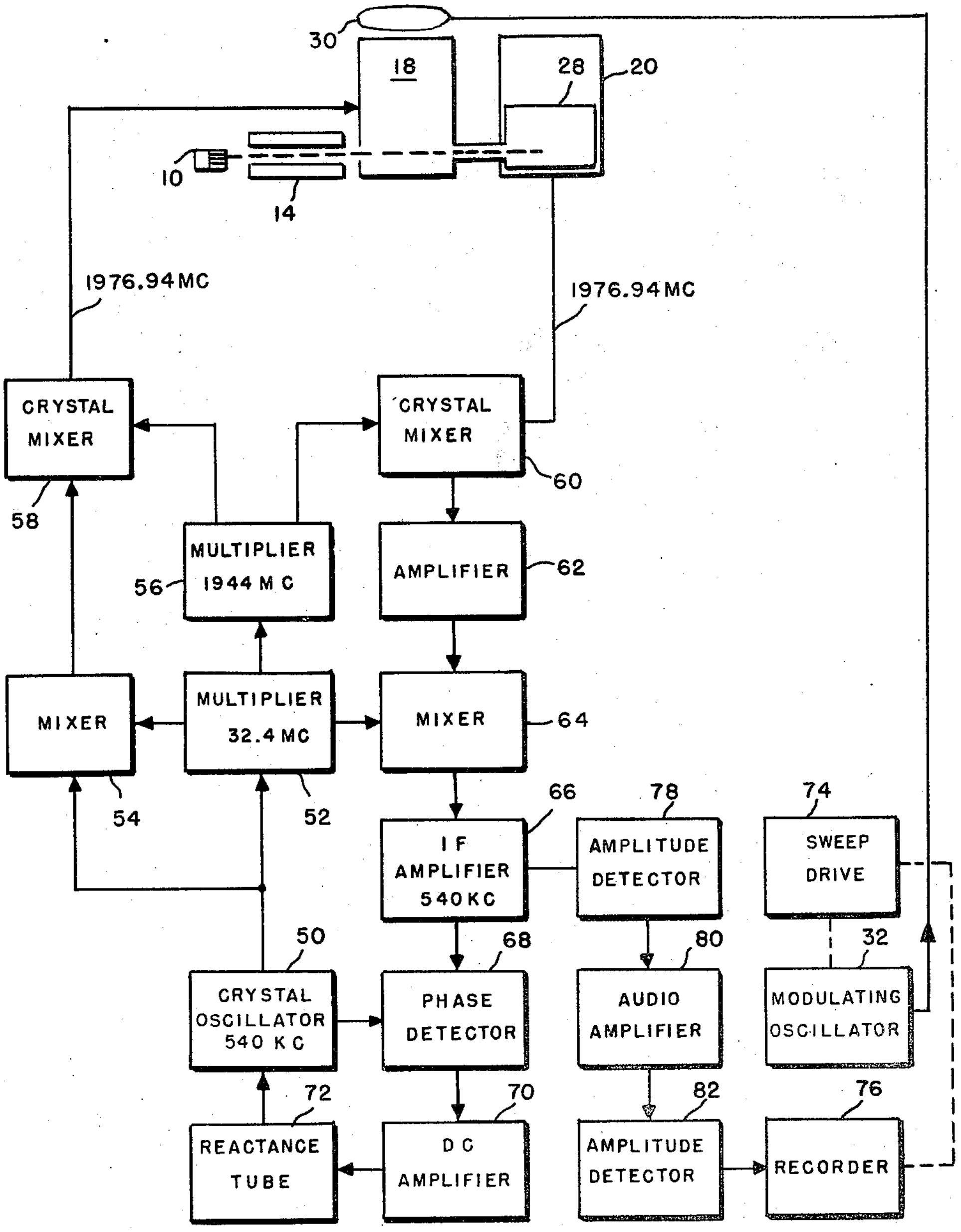
Figure 2 is a block diagram of an atomic oscillator embodying the invention, including provision for relaxation time measurement.

An electronic system for providing the phase-locked drive for the input cavity and the Zeeman modulating voltage, and for detecting the variation of the amplitude modulation of the output, is shown in Figure 2. In order to get the necessary short-time stability of the driving oscillator, a crystal oscillator and a multiplier chain is used. The same oscillator and multiplier chain serves as both local oscillators of a double superhetrodyne receiver. A high first I.F. is necessary to reduce the noise due to the crystal detectors, and a low second I.F. is necessary to get sufficient selectivity to prevent second order noise due to noise components beating with each other instead of just with the carrier in the modulation detector. For a 10 kc. second I.F. bandwidth the signal-to-noise ratio should be about 10 db at the detector. With 30% amplitude modulation and a 0.1 c.p.s. bandwidth at the input to the amplitude modulation recorder, the signal-to-noise ratio should be about 40 db. Pulse modulation would give somewhat higher signal-to-noise ratio but might make it harder to keep the oscillator phase-locked.

In Figure 2, components having the same function as those in Figure 1 are similarly numbered and need not be further described. The 1976.94 mc. stimulating potential applied to auxiliary cavity 18 is derived from a 540 kc. crystal oscillator 50, the output of which is multiplied 60 times in frequency multiplier 52 to yield a frequency of 32.4 mc., which is heterodyned with the output of the oscillator in mixer 54 to provide a sum frequency of 32.94 mc. The output of multiplier 52 is further multiplied 60 times at 56 to provide a 1944 mc. signal, which is heterodyned at crystal mixer 58 with the 32.4 mc. output of mixer 54 to provide the sum frequency potential of 1976.94 mc. This potential is applied to cavity 18 as a stimulating potential, and need not have a degree of frequency stability greater than that provided by a well regulated crystal oscillator. However, as above noted, the potential applied to auxiliary cavity must be kept reasonably locked with the phase of the output of cavity 20. To this end the output of the latter is heterodyned in crystal mixer 60 with the 1944 mc. output of frequency multiplier 56, and the difference frequency of 32.94 mc. is amplified in amplifier 62 tuned to this frequency. The output of the amplifier is further heterodyned in mixer 64 with the 32.4 mc. output of multiplier 52 to yield a 540 kc. difference frequency, which is amplified by amplifier 66 tuned to this frequency. The 540 kc. output of this amplifier is compared with the 540 kc. output of oscillator 50 in phase detector 68. Any phase difference is there transformed to a direct current potential which is representative of this difference, and this potential is amplified at 70 and used to vary a reactance tube 72 connected to oscillator 50 to vary the phase of its output in such direction that the output of detector 68 becomes zero, at which point phase coincidence occurs. In this manner the phase of the stimulating signal applied to the auxiliary cavity is kept locked with the phase of the output of the hot cavity 20.

As above pointed out, the fraction of lower state particles in the cavity 20 can be determined by Zeeman modulating the atomic beam and measuring the amount of amplitude modulation of the output. This modulation is accomplished by means of an alternating current applied to coils 30 from a low frequency oscillator 32, the frequency of which is variable from a frequency below to a frequency above the reciprocal of the relaxation time, in this case from about 0.2 to 2000 cycles per second. This frequency is varied cyclically at a rate of about one octave per minute by a motor 74 coupled to the frequency varying element of oscillator 32. The motor is also coupled to a recorder 76 so that a reference mark is recorded on the moving paper chart thereof for every octave of frequency variation of the oscillator.

Any amplitude modulation in the output of cavity 20 appears in the output of amplifier 66. This is demodulated by amplitude modulation detector 78 and the output thereof is amplified by amplifier 80 having a band pass of from 0.2 to 2000 cycles per second. The output of amplifier 80 is further rectified by a detector having a time constant of less than 0.1 cycles per second and then applied to recorder 76. Thus a continuous record is made of the amount of amplitude modulation relative to the modulating frequency, from which record the fraction of lower state particles in the main cavity 20 can be determined.

Figure 3:
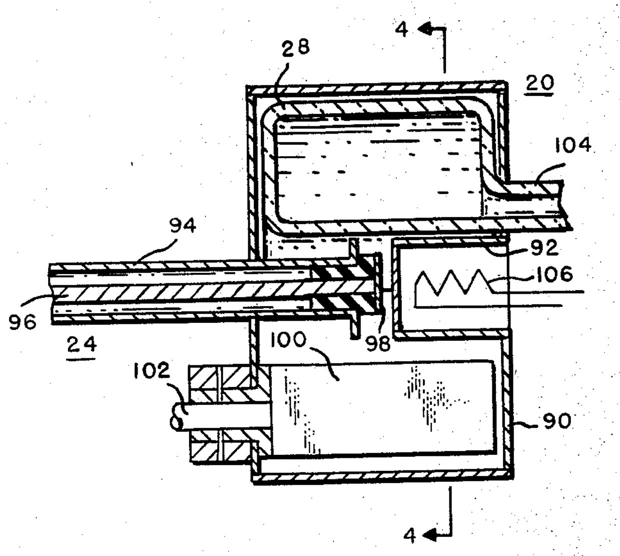
Figure 3 is a cross section of a practical embodiment of the cavity of Figure 1.
Figure 4:
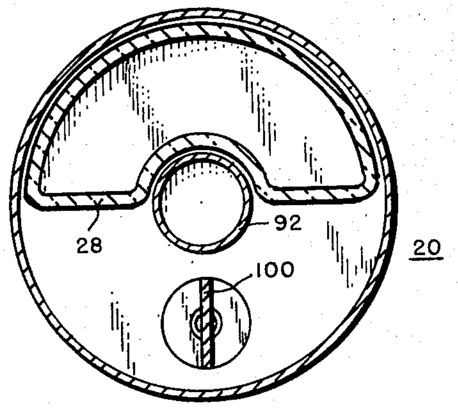
Figure 4 is a cross section taken along lines 4—4 of Figure 3.

Figures 3 and 4 illustrate a portion of a practical embodiment of the hot cavity 20, which comprises a cylindrical shell made of molybdenum, and have a diameter of 3 inches and a height of 2 inches. The cavity has a reentrant portion 92 coaxial therewith, extending into the cavity toward the reentrant portion of the coaxial line 24, through which the output of the cavity is taken. Line 24 comprises an outer conductor 94 and an inner conductor 96. Conductor 96 terminates in an end plate 98 parallel to and juxtaposed to the inner end of reentrant portion 92. The capacity therebetween and the inductance of the two stubs formed by reentrant portion 92 and the portion of line 94 within the cavity, both of which are less than a quarter wavelength long, resonate to the desired frequency of about 1976 mc. A vane 100, which can be rotated from outside the cavity by means of a shaft 102 can be adjusted to vary the resonant frequency to the exact amount desired.

Within the reentrant portion 92 may be positioned a temperature sensitive resistor, shown symbolically at 106, for the purpose of indicating and/or regulating the temperature of the cavity.

Quartz container 28 is generally semi-cylindrical in shape and occupies about half the cavity 20. The container has an inlet portion 104, through which the silver vapor is admitted.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A quantum mechanical resonance device comprising a cavity resonator, a gas contained in a portion of said resonator and comprising a mixture of particles in at least two energy states, the number of particles in the higher energy state being greater than that which exists when said gas is in a state of thermal equilibrium, whereby upon passing to a lower energy state they radiate waves of a predetermined microwave frequency, said resonator being tuned in a fundamental mode to said frequency, the walls of said portion of said resonator being of a dielectric material which will not produce relaxation when said particles come into contact therewith a number of times, whereby said particles will travel for a longer time before relaxation occurs.

2. An atomic resonance device comprising a cavity resonator, a dielectric container occupying a portion of said resonator, a gas in said container comprising a mixture of atoms in at least two energy states, said atoms having an odd electron, the number of atoms in the higher energy state being greater than that which exists when said gas is in a state of thermal equilibrium, whereby upon passing to a lower energy state they radiate energy of a predetermined microwave frequency, said resonator being tuned in a fundamental mode to said frequency, said container being of material which will not produce relaxation as said atoms come into contact therewith a number of times, whereby said particles will travel for a longer time before relaxation occurs.

3. An atomic resonance device as set forth in claim 2, wherein said gas has a higher work function than the walls of said container.

4. An atomic resonance device as set forth in claim 3, wherein said container is made of a metallic oxide.

5. An atomic resonance device as set forth in claim 4, said oxide is one of a group consisting of fused silica, alumina, beryllia, magnesia, and zirconia.

6. An atomic resonance device as set forth in claim 4, wherein said oxide is aluminum oxide.

7. An atomic resonance device as set forth in claim 5, wherein said oxide is quartz.

8. An atomic resonance device as set forth in claim 2, wherein said container is maintained at a temperature which is well above the vaporizing temperature of said gas, wherein said gas does not form a stable oxide with the material of said container, wherein the work function of said gas is greater than that of said material, and wherein said atoms have an odd number of electrons.

9. In a quantum mechanical resonance device, means for producing a column of gas at low pressure comprising a mixture of particles in two energy states normally in energy equilibrium, a focusing means through which said gas is passed for producing a resultant mixture having a preponderance of particles in the higher of said energy states, means for passing said resultant mixture through a first cavity resonator and thence into a second cavity resonator wherein said particles, during transition from the higher to the lower of said energy states, radiate energy at a predetermined microwave frequency, at least said second resonator being resonant in a fundamental mode in the region of said microwave frequency, a source of stimulating potential in the region of said microwave frequency coupled to said first cavity resonator, an output circuit coupled to said second resonator for extracting radiated microwave energy therefrom, and means coupled to said second resonator and to said source for phase locking said stimulating potential to the energy radiated in said second resonator.

10. In an atomic resonance device, means for producing a column of gas at low pressure comprising a mixture of atoms in two energy states normally in thermal equilibrium, a magnetic focusing means through which said gas is passed for producing a resultant mixture having a preponderance of atoms in the higher of said energy states, means for pasing said resultant mixture through a first cavity resonator and thence into a sealed container of dielectric material wherein said atoms, during transition from the higher to the lower of said energy states, radiate energy at a predetermined microwave frequency, said material being of a composition which will not produce relaxation when said atoms come into the vicinity thereof, whereby said atoms will travel for a longer time before relaxation occurs, said container being situated within a second cavity resonator which is larger than said container, both resonators being resonant in a fundamental mode in the region of said microwave frequency, a source of stimulating potential in the region of said microwave frequency coupled to said first cavity resonator, and an output circuit coupled to said second resonator for extracting radiated microwave energy therefrom.

11. In an atomic resonance device, means for producing a column of gas at low pressure comprising a mixture of atoms in two energy states normally in thermal equilibrium, means through which said gas is passed for producing a resultant mixture having a preponderance of atoms in the higher of said energy states, means for passing said resultant mixture into a sealed container of dielectric material wherein said atoms, during transition from the higher to the lower of said energy states, radiate energy at a predetermined microwave frequency, said material being of a composition which will not produce relaxation when said atoms come into the vicinity thereof, whereby said atoms will travel for a longer time before relaxation occurs, and means resonant in a fundamental mode in the region of said microwave frequency and associated with said container for extracting radiated microwave energy therefrom.

12. In an atomic resonance device, means for producing a gas at low pressure comprising a mixture of atoms having a preponderance of atoms in the higher of at least two energy states, means for passing said mixture into a sealed container of dielectric material wherein said particles atoms, during transition from the higher to the lower of said energy states, radiate energy at a predetermined microwave frequency, said material being of a composition which will not produce relaxation when said particles atoms come into the vicinity thereof, whereby said atoms particles will travel for a longer time before relaxation occurs, said container being situated within a cavity resonator which is resonant in a fundamental mode in the region of said microwave frequency, a source of stimulating potential in the region of said microwave frequency coupled to said cavity resonator, an output circuit coupled to said second resonator for extracting radiated microwave energy therefrom, and means coupled to said resonator and to said source for phase locking said stimulating potential to the radiated energy in said resonator.

13. An atomic oscillator including means for producing a column of gas at low pressure comprising a mixture of atoms in two energy states normally in thermal equilibrium, a magnetic focusing means through which said gas is passed for producing a resultant mixture having a preponderance of atoms in the higher of said energy states, means for passing said resultant mixture through a first cavity resonator and thence into a sealed container of dielectric material wherein said atoms, during transition from the higher to the lower of said energy states, radiate energy at a predetermined microwave frequency, said material being of a composition which will not produce relaxation when said atoms come into the vicinity thereof, whereby said atoms will travel for a longer time before relaxation occurs, said container being situated within a second cavity resonator which is larger than said container, both resonators being resonant in a fundamental mode in the region of said microwave frequency, an output circuit coupled to said second resonator for extracting radiated microwave energy therefrom, and means coupled to said second resonator for applying to said first resonator a potential field which is of the same phase as that of the energy radiated in said second resonator.

14. A device as set forth in claim 13, wherein said container is maintained at a temperature well above the vaporizing temperature of the element of which gas is constituted, wherein said element does not form a stable oxide with said material, wherein the ionization potential of said element is greater than the work function of said material, and wherein said atoms have an odd number of electrons.

15. A device as set forth in claim 14, wherein said gas is silver vapor.

16. A device as set forth in claim 15, wherein said material is quartz.

17. A device as set forth in claim 15, wherein said material is an oxide of aluminum.

18. A device as set forth in claim 13, including means for measuring the line shape and width of the radiated microwave energy, said means comprising means coupled to said first resonator to magnetically modulate said atoms at a frequency which is varied from a value which is lower to a value which is higher than the reciprocal of the relaxation time, and means coupled to said second resonator to indicate the amount of amplitude modulation in the output thereof.

(References on following page)

References Cited in the file of this patent

UNITED STATES PATENTS

| | | |
|---|---|---|
| 2,762,872 | Dicke | Sept. 11, 1956 |
| 2,837,693 | Norton | June 3, 1958 |

OTHER REFERENCES

Pub. IV, "The Molecular Beam Magnetic Resonance Method. The Radiofrequency Spectra of Atoms and Molecules," Review of Modern Physics, vol. 18, No. 3, July 1946, pp. 323–333.

Article, "The Maser: New Type of Microwave Amplifier, Frequency Standard and Spectrometer," pages 1264–1274 of Physical Review for August 1955, vol. 99.

Article, "Ultrasonic Relaxation in Normal Propyl Alcohol," by Lyon et al., pages 179–187, Journal of Applied Physics, vol. 27, No. 2, for February 1956.

Article, "Relaxation Effects in Nuclear Magnetic Resonance Absorption," by Bloembergen et al., pages 679–712 of Physical Review, vol. 73, No. 7, April 1, 1948.

Article, "Molecules and Microwaves," pages 254–257 of Electronic and Radio Engineer for July 1957.